United States Patent
Filgas

[19]
[11] Patent Number: 5,867,519
[45] Date of Patent: *Feb. 2, 1999

[54] MULTIPLE ELEMENT, FOLDED BEAM LASER

[75] Inventor: David Michael Filgas, Danville, Calif.

[73] Assignee: Lumonics Inc., Kanata, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 689,356

[22] Filed: Aug. 7, 1996

[51] Int. Cl.⁶ ..................................... H01S 3/081
[52] U.S. Cl. ................. 372/93; 372/68; 372/69; 372/100
[58] Field of Search ................ 372/92, 93, 98, 372/68, 69–72, 100, 66

[56] References Cited

U.S. PATENT DOCUMENTS

| | | |
|---|---|---|
| 3,289,099 | 11/1966 | Masters . |
| 3,289,101 | 11/1966 | Masters et al. . |
| 3,327,243 | 6/1967 | Stickley . |
| 3,361,987 | 1/1968 | DeMaria . |
| 3,496,487 | 2/1970 | Soffer et al. . |
| 3,512,104 | 5/1970 | Miller . |
| 3,581,229 | 5/1971 | Martin . |
| 3,725,817 | 4/1973 | Nolan . |
| 3,868,591 | 2/1975 | Mumola et al. . |
| 4,173,001 | 10/1979 | Koepf . |
| 4,420,836 | 12/1983 | Harper . |
| 4,500,996 | 2/1985 | Sasnett et al. . |
| 4,644,555 | 2/1987 | Amano . |
| 4,677,639 | 6/1987 | Sasser . |
| 4,697,271 | 9/1987 | Amano ..................................... 372/68 |
| 4,734,913 | 3/1988 | Morris et al. . |
| 4,757,511 | 7/1988 | Klingel et al. . |
| 4,835,786 | 5/1989 | Morris et al. . |
| 4,860,301 | 8/1989 | Nicholson . |
| 4,910,746 | 3/1990 | Nicholson ................................. 372/69 |
| 4,922,502 | 5/1990 | Unternahrer et al. .................... 372/72 |
| 5,001,718 | 3/1991 | Burrows et al. .......................... 372/68 |
| 5,021,742 | 6/1991 | Jacob ....................................... 372/66 |
| 5,023,886 | 6/1991 | Hobart et al. . |
| 5,134,626 | 7/1992 | Oda et al. . |
| 5,148,443 | 9/1992 | Du et al. ................................. 372/92 |
| 5,237,584 | 8/1993 | Shannon et al. . |
| 5,263,042 | 11/1993 | Kojima et al. ........................... 372/72 |
| 5,272,713 | 12/1993 | Sobey et al. ............................. 372/69 |
| 5,301,009 | 4/1994 | Shurtz, II . |
| 5,412,685 | 5/1995 | Egawa et al. . |
| 5,590,147 | 12/1996 | Hobbs et al. . |
| 5,596,594 | 1/1997 | Egawa ..................................... 372/93 |
| 5,608,754 | 3/1997 | Murakami et al. ....................... 372/93 |

FOREIGN PATENT DOCUMENTS

| | | |
|---|---|---|
| 0643716 | 11/1993 | Australia . |
| 0226790 | 7/1987 | European Pat. Off. . |
| 1614560 | 8/1970 | Germany . |
| 3813569 | 11/1989 | Germany . |
| 4004071 | 8/1991 | Germany . |
| 42-23387 | 11/1967 | Japan . |
| 2098990 | 4/1990 | Japan . |
| 8910641 | 11/1989 | WIPO . |
| 9106994 | 5/1991 | WIPO . |

*Primary Examiner*—Leon Scott, Jr.
*Attorney, Agent, or Firm*—Carr & Ferrell LLP

[57] ABSTRACT

A multi-element, folded beam laser includes a plurality of laser medium elements, pumping means, a highly reflective reflector, an output coupler and one or more beam directors for redirecting the beam through the elements and between the reflector and the output coupler. An alternate folded beam ring laser and an alternate folded beam laser amplifier are also disclosed.

27 Claims, 12 Drawing Sheets

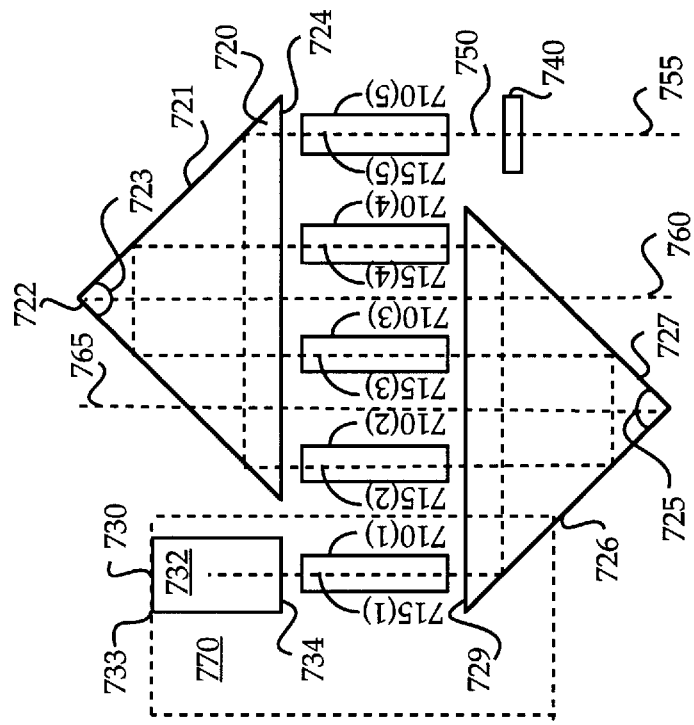
FIG. 7C (upper)
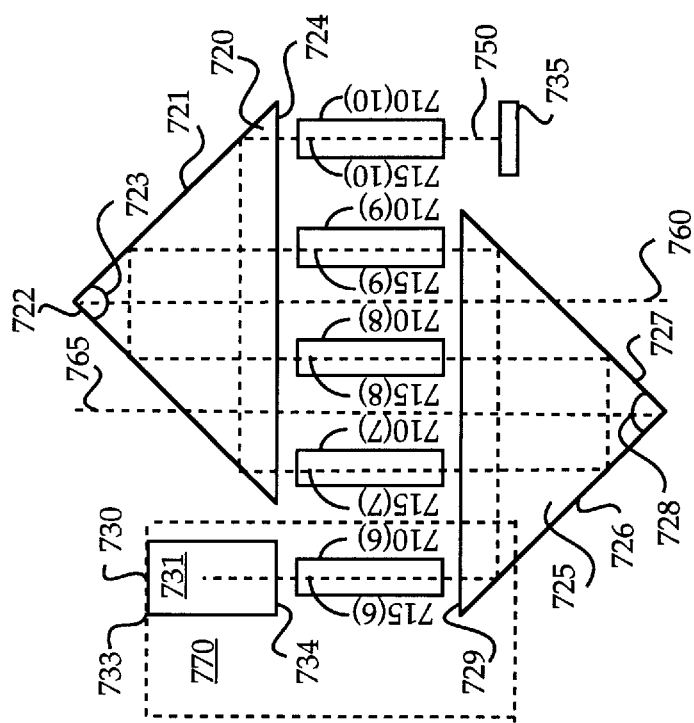
FIG. 7B (lower)

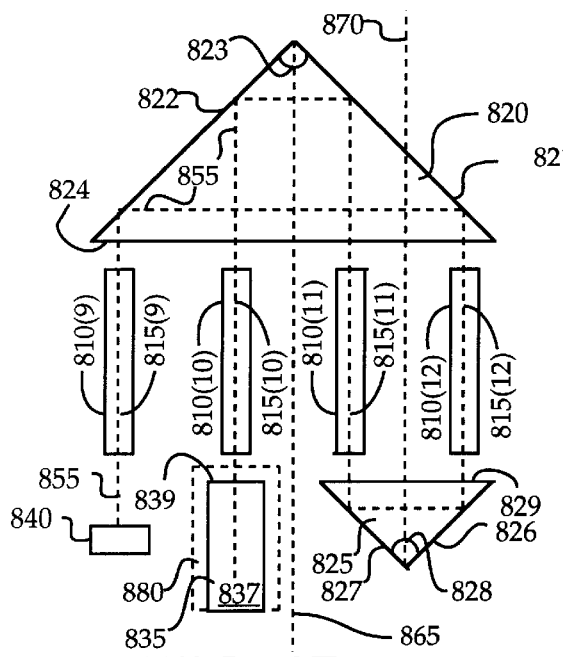
FIG. 8B (3rd row)
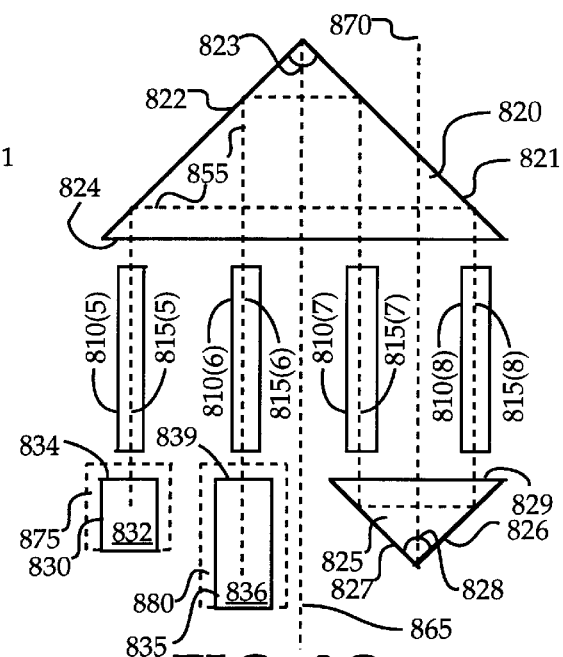
FIG. 8C (2nd row)
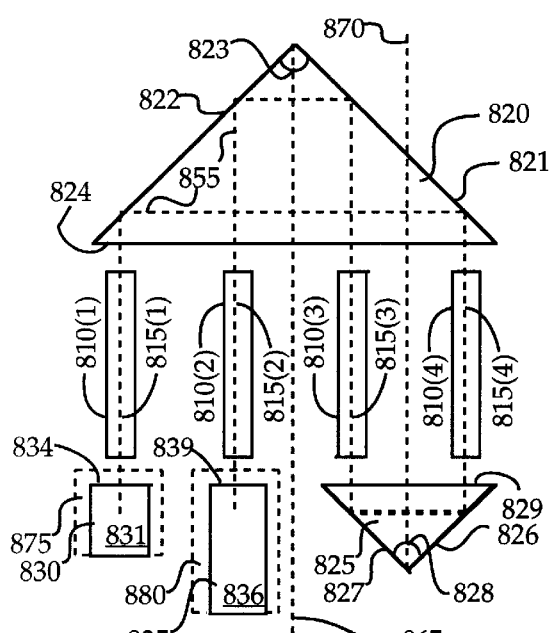
FIG. 8D (1st row)
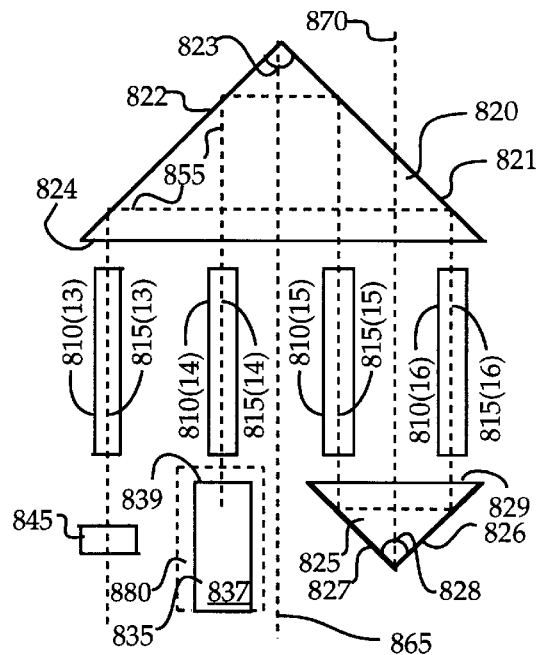
FIG. 8E (4th row)

MULTIPLE ELEMENT, FOLDED BEAM LASER

BACKGROUND OF THE INVENTION

1. Field of the Invention

This invention relates generally to the field of lasers, and more particularly to lasers having multiple elements of lasing medium and a folded beam path.

2. Description of the Background Art

Known solid state lasers include a crystal of active laser medium, for example a cylindrical rod of ruby or neodimium-doped yttrium aluminum garnet (YAG), and one or more pumping lamps, enclosed in a highly reflective housing. A highly reflecting mirror and a partially reflecting mirror are positioned to face one another at opposite ends of the laser medium such that light emitted from the laser medium is reflected back and fourth between the highly and partially reflecting mirrors.

The pumping lamps produce light which excites the atoms of the laser medium to a metastable state. The relaxation of the excited atoms to their ground state is accompanied by the emission of light. Some of the emitted light is reflected back and fourth between the end mirrors, and the growing reflected wave induces the emission of additional light into the reflected wave state. The partially reflecting mirror, also referred to as an output coupler, allows a portion of the reflected light to pass as the output beam of the laser.

The power output of solid state lasers depends upon, among other things, the length of the path of the beam within the laser medium. Thus, the power output of such a laser can be increased by increasing the length of the laser medium. This approach has at least two practical limitations, however. First, rods of increased length are difficult and expensive to manufacture. Second, beam quality deteriorates rapidly when rods exceed six to eight inches in length.

Due to the limitations of a single long rod, typical high powered lasers employ multiple short rods. FIG. 1 shows a cross-sectional view of a prior art multirod laser 100. Prior art laser 100 includes pump chambers 102(1–3), high reflector 108 which has a highly reflecting face 109, and output coupler 110 which has a partially reflecting face 111.

Pump chambers 102(1–3) include cylindrical laser rods 112(1–3) and two cylindrical arc lamps 114(1–3) and 116(1–3), mounted axially parallel in highly reflecting housings 118(1–3). Pump chambers 102(1–3) are aligned such that the axes of laser rods 112(1–3) are colinear and define an optical path 130 which is perpendicular to faces 109 and 111 of high reflector 108 and output coupler 110, respectively.

Combining multiple pump chambers in series as shown in laser 100 significantly increases output power, but the number of pump chambers that can be used in a system is practically limited by increased length making the system more awkward to work with and requiring more complex alignment processes to optimize the laser output.

Prior art patents have suggested folding the optical path of a laser to decrease the laser length overall and increase the optical path length within the active laser medium. For example, U.S. Pat. No. 5,148,443, issued to Du et al., teaches folding the beam within a single cavity of active laser medium by providing retroreflecting mirrors at each end of the cavity. This approach appears well-suited to gas lasers, but if the laser medium is solid state, then the size of the cavity is limited to the size of the available medium crystal. Thus, as applied to solid state lasers, Du et al. suffers the same limitations as the single crystal lasers described above.

Similarly, U.S. Pat. No. 3,361,987, issued to DeMaria, teaches folding the beam within a single poly-sided crystal. This single crystal method suffers the same limitations as do the single crystal lasers described above.

SUMMARY OF THE INVENTION

The present invention teaches a multi-element, folded beam laser including a plurality of laser medium elements, a pumping means, a highly reflective reflector, an output coupler, and a beam director. Pumping light incident from the pumping means, for example arc lamps, stimulates the laser medium elements, preferably solid state laser rods, to emit a laser beam which is directed by the beam director along a folded optical path. The reflector reflects nearly 100% of incident laser light back along the optical path. The output coupler passes a portion of the incident laser light as a laser output beam and reflects the remainder of the incident laser light back along the optical path, thus establishing an optical resonator in the cavity defined between the reflector and the output coupler.

One laser of the present invention includes exactly two beam directors and one row of laser medium elements, each element having a respective axis, disposed such that the axes are parallel, coplanar, and equally spaced. The two beam directors are each right isoceles prisms, having a base surface and two orthogonal surfaces which internally reflect beams to redirect incident light beams 180 degrees. The beam directors are spaced from opposite ends of the laser medium elements with the base surfaces perpendicular to the axes of the laser medium elements, such that pairs of laser medium elements are disposed symetrically about the bisector of the right angle vertex of each prism. A beam emitted along the axis of a first element is redirected by the beam directors 180 degrees along the axis of a second element disposed symetrically relative to the first element about the bisector of the right angle vertex of the beam director.

An alternate embodiment of the laser of the present invention includes two rows of coplanar laser medium elements and exactly three beam directors. Each of the beam directors are right isosceles prisms which redirect incident light beams 180 degrees. Two of the beam directors are intraplanar beam directors, which fold the beam between laser medium elements within a common plane. The third beam director is an interplanar beam director which folds the beam between elements of different planes.

Another alternate embodiment of the laser of the present invention includes multiple rows of coplanar laser medium elements and exactly four beam directors. Each of the beam directors is a right isosceles prism which redirects incident light beams 180 degrees. Two of the beam directors are intraplanar beam directors, which fold the beam between laser medium elements within a common plane. The other two beam directors are interplanar beam directors which fold the beam between elements of different planes.

An alternate ring laser of the present invention includes a plurality of laser medium elements, a pumping means, an output coupler, and at least one beam director. Pumping light incident from the pumping means, for example arc lamps, stimulates the laser medium elements, preferably solid state laser rods, to emit a laser beam which is directed by the beam director along a looped optical path. The beam directors are right isoceles prisms, having a base surface and two orthogonal surfaces which internally reflect beams to redirect incident light beams 180 degrees. The output coupler is an output beam director comprising a right isosceles prism having a base surface and two orthogonal internally reflecting surfaces, one of which is coated to frustrate total internal reflection, thus passing a portion of the incident laser light as a laser output beam and redirecting the remainder of the incident light 180 degrees along the looped optical path. The beam directors and the output beam director fold the beam to pass axially through each of the elements along the looped optical path, thus establishing a ring laser.

Finally, an alternate laser amplifier of the present invention includes a plurality of laser medium elements, each having a respective axis, a pumping means, and at least one beam director. A laser beam emitted by a source laser is directed by the beam director(s) axially through the laser medium elements. The pumping means excites the laser medium elements to emit light, thus amplifying the source laser beam.

In each disclosed embodiment, the pumping means (i.e., plurality of arc lamps) is disposed such that each pumping element (i.e., individual arc lamp) simultaneously pumps a plurality of laser medium elements. Particularly, the arc lamps are disposed perpendicular to the axes of the laser medium elements, such that each arc lamp flashes on an entire row of laser medium elements, thus reducing problems caused by non-uniform flashing of the arc lamps.

BRIEF DESCRIPTION OF THE DRAWINGS

FIG. 7B shows a horizontal cross-section taken along the plane of the axes of the lower row of elements of the laser of FIG. 7A;

FIG. 7C shows a horizontal cross-section taken along the plane of the axes of the upper row of elements of the laser of FIG. 7A;

FIGS. 8A–8E are perspective views of alternate embodiments of a laser having multiple rows of multiple elements and four beam directors;

DETAILED DESCRIPTION OF A PREFERRED EMBODIMENT

The present invention provides a novel, high power, multi-element, folded beam laser. Numerous specific details, such as the type and number of laser medium elements and the use of arc lamps for pumping are set forth to illustrate the invention, but the invention may be practiced apart from these specific details. In other instances, details of well-known equipment and processes, for example the provision of a cooling system, are omitted for the sake of clarity.

Figure 1:
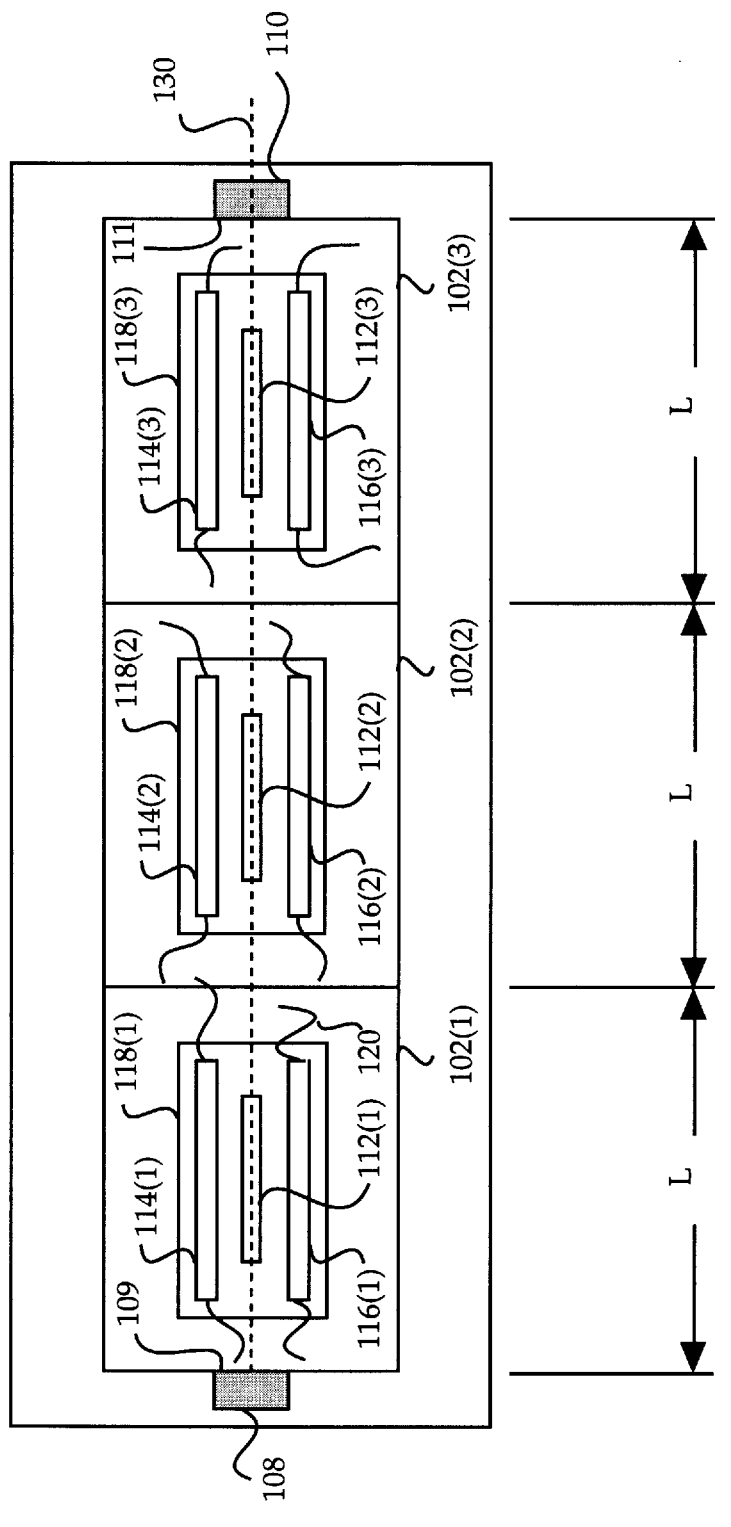
FIG. 1 is a cross-sectional view of a prior art multi-rod laser.
Figure 2:
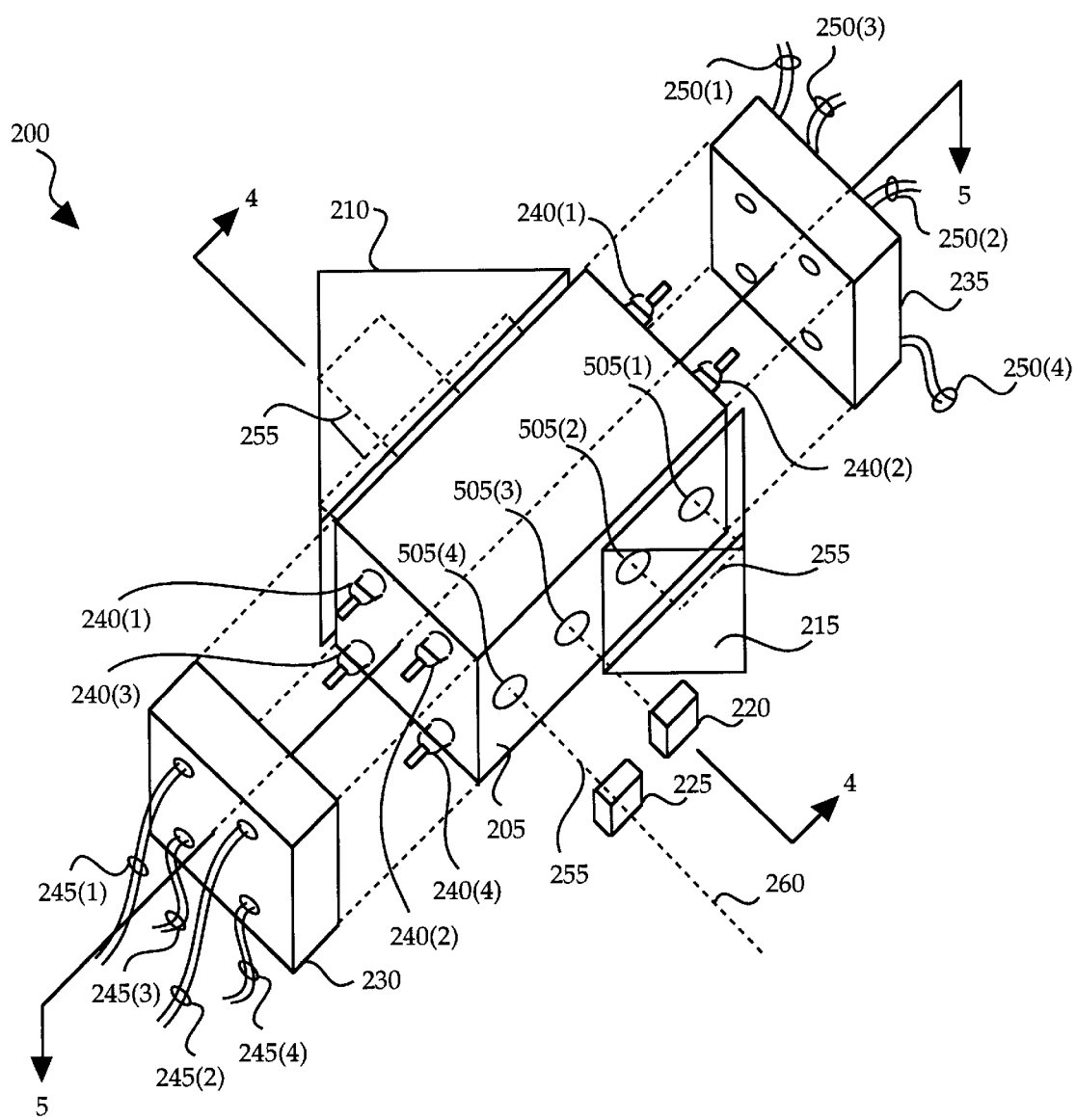
FIG. 2 is a partially exploded perspective view of a laser constructed in accordance with the present invention.

FIG. 2 shows a laser 200 including a pump chamber housing 205, a first beam director 210, a second beam director 215, a highly reflecting reflector 220, an output coupler 225 and insulator blocks 230 and 235. Pump chamber housing 205 supports four laser medium elements 505 (1–4), of which only one end of each is visible in FIG. 2. Each element 505(1–4) has a central axis coincident with an optical path 255, which passes from reflector 220 to output coupler 225, between which the path 255 is folded by beam directors 210 and 215. Housing 205 also supports arc lamps 240(1–4) which are supplied with electrical power via electrical leads 245(1–4) and 250(1–4) passing through insulator blocks 230 and 235 respectively. As an alternative to optical pumping by arc lamps, other pumping means, such as gas discharges, chemical reactions, direct electrical current and plasma pumping may be employed.

Pumping light incident from arc lamps 240(1–4) stimulates the four laser medium elements 505(1–4) to emit a laser beam which is directed by beam directors 210 and 215 along optical path 255. Reflector 220 reflects nearly 100% of incident laser light back along optical path 255. Output coupler 225 passes a portion of the incident laser light as laser output beam 260 and reflects the remainder of the incident laser light back along optical path 255, thus establishing an optical resonator in the cavity defined between reflector 220 and output coupler 225.

Figure 3:
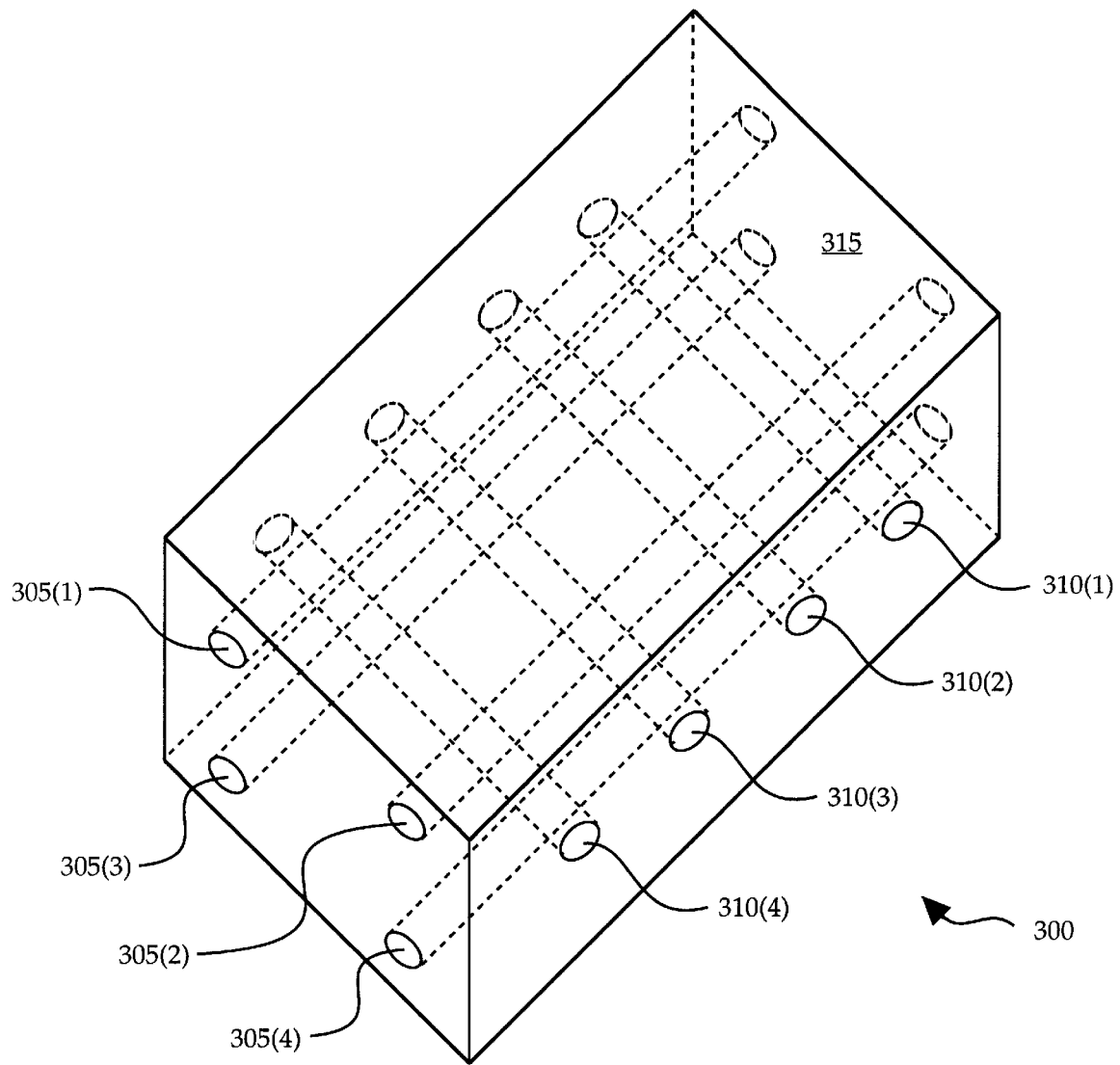
FIG. 3 is a perspective view of a pump chamber block in accordance with the present invention.

FIG. 3 shows a perspective view of a pump chamber block 300, which is an optically transparent solid, including lamp bores 305(1–4) and element bores 310(1–4). Block 300 is optional, and may be used to facilitate assembly of a laser 200. Lamp bores 305(1, 2) are disposed perpendicular to and above element bores 310(1–4). Lamp bores 305(3, 4) are disposed perpendicular to and below element bores 310(1–4). Since lamp bores 305(1–4) are oriented non-parallel to element bores 310(1–4), each arc lamp 240(1–4) flashes on each laser medium element 505(1–4), which reduces problems caused by non-uniform flashing of the arc lamps. Preferably, the exterior surface 315 of pump chamber block 300 is covered with a reflective coating to reflect light emitted from lamps 240(1–4) toward the interior of pump chamber block 300, thus increasing the amount of pump light incident on laser medium elements 505(1–4).

Figure 4:
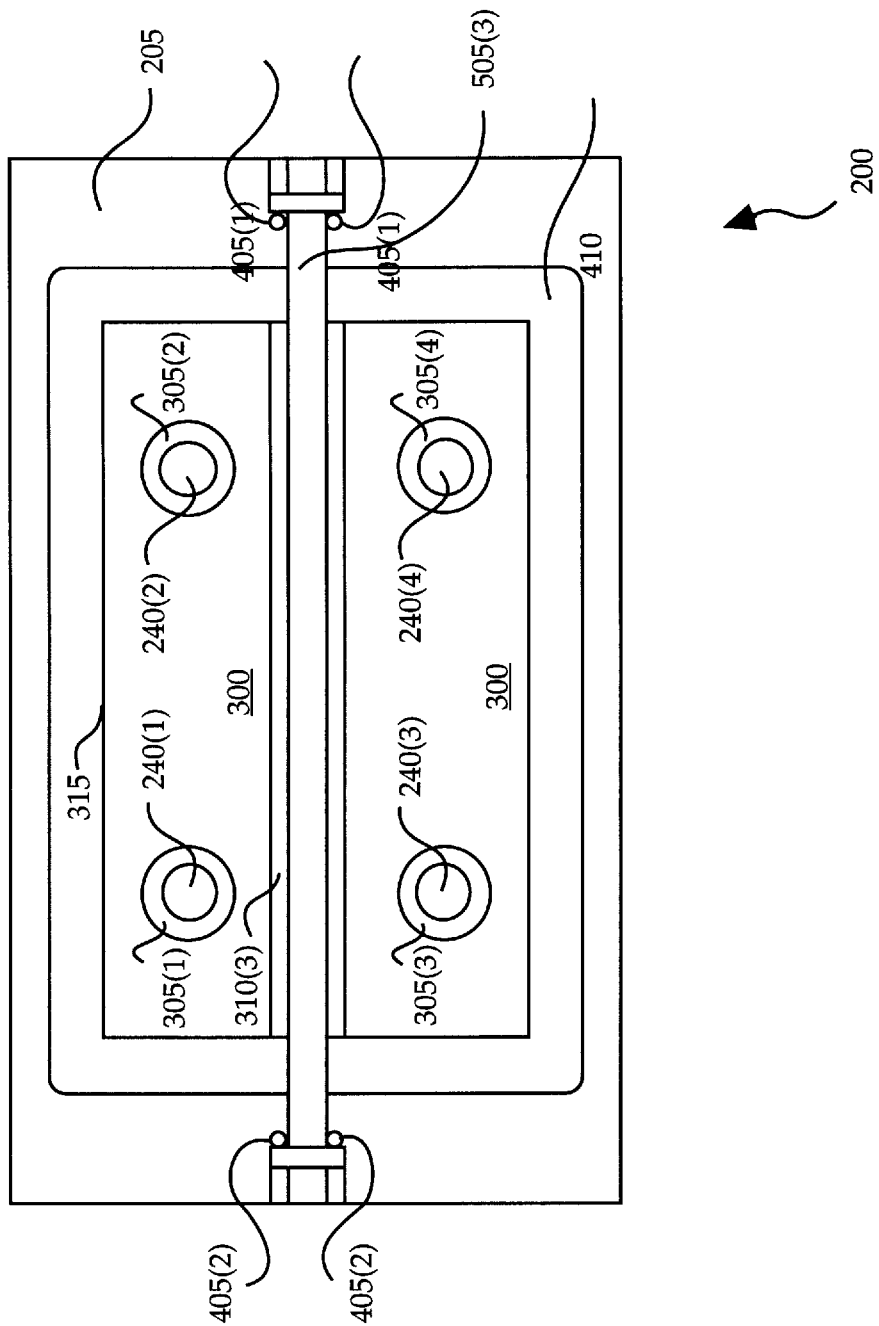
FIG. 4 is a cross-sectional view taken along line 4—4 of the laser of FIG. 2.

FIG. 4 shows a cross-sectional view of laser 200, including optional pump chamber block 300, pump chamber housing 205, laser medium element 505(3), arc lamps 240 (1–4), and "O"-rings 405(1, 2). Pump chamber housing 205 defines an internal coolant cavity 410, and contains and provides support for laser medium elements 505(1–4), arc lamps 240(1–4), and pump chamber block 300. "O"-rings 405(1, 2) provide a seal between laser medium element 505(3) and pump chamber housing 205, and prevent the leakage of coolant from coolant cavity 410. Additional "O"rings (not shown) provide seals between the additional laser medium elements 505(1, 2, 4) and pump chamber housing 205. Lamp bores 305(1–4) and element bores 310(1–4) (of which only one is shown) all communicate with coolant cavity 410. The diameters of lamp bores 305(1–4) and of element bores 310(1–4) are slightly larger than the diameters of lamps 240(1–4) and elements 505 (1–4), respectively, such that coolant can flow through the spaces defined therebetween.

Figure 5:
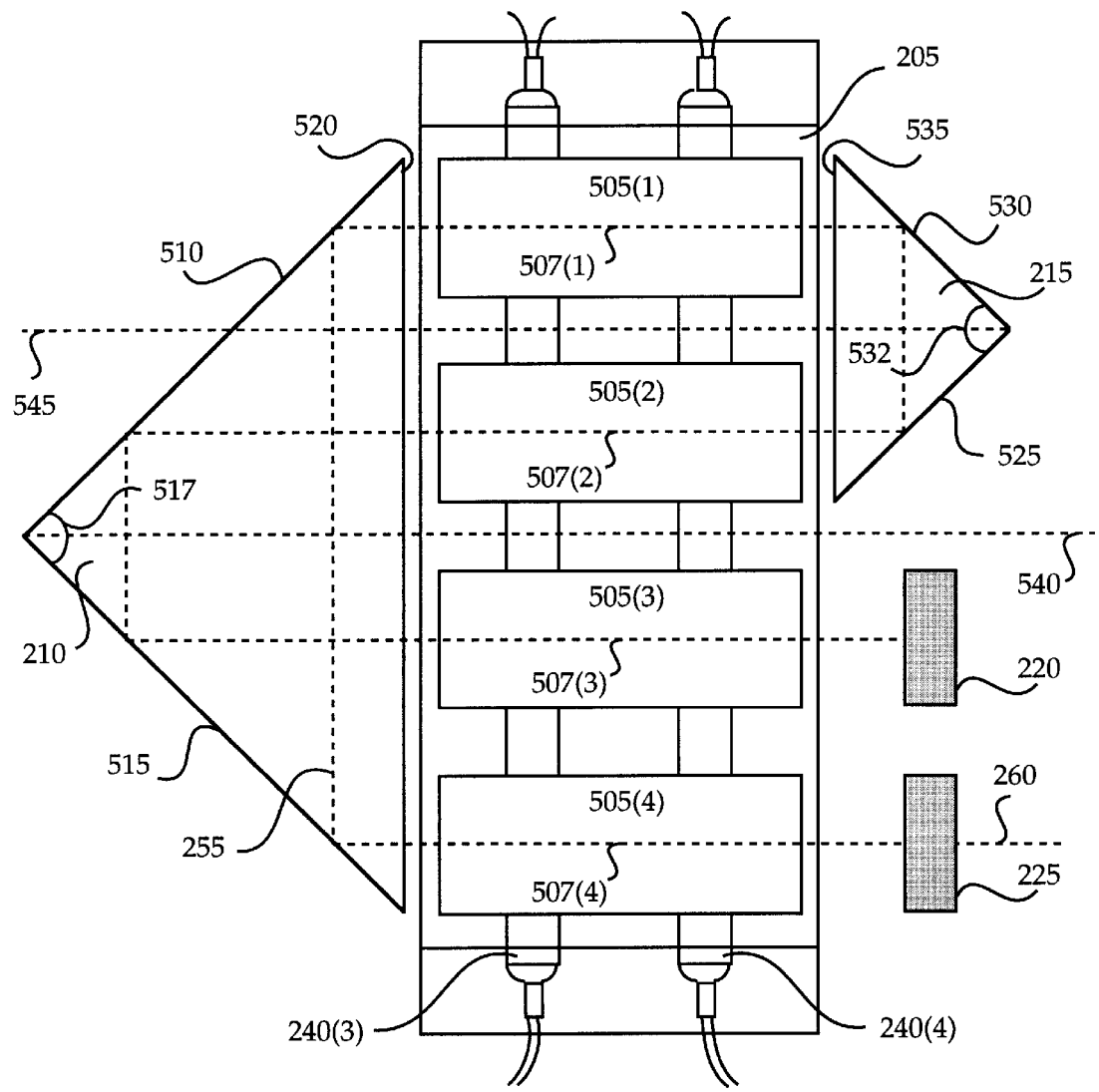
FIG. 5 is a cross-sectional view taken along line 5—5 of the laser of FIG. 2.

FIG. 5 is a view looking in the direction of FIG. 2 arrows 5—5 towards a cross-section of laser 200, in which the lower half of pump chamber housing 205 is seen containing arc lamps 240(3,4), and the four laser medium elements 505(1–4). Laser medium elements 505(1–4) are right circular cylindrical rods disposed with their respective central axes 507(1–4) parallel, coplanar and equally spaced. Laser medium elements 505(1–4) are preferably solid state crystals such as ruby rods, but non-solid state laser medium elements such as a liquid or gas medium in glass containers are within the scope of the invention.

First beam director 210 is preferably a right isosceles prism, having two orthogonal internally reflecting surfaces 510 and 515, the vertex of which forms a right angle 517, and a base surface 520. Second beam director 215 is preferably also a right isosceles prism, having two orthogonal internally reflecting surfaces 525 and 530, the vertex of which forms a right angle 532, and a base surface 535. The pair of reflecting surfaces 510 and 515 in beam director 210 and the pair of reflecting surfaces 525 and 530 in beam director 215 having orthogonal dispositions each redirects incident light beams 180 degrees. Alternative means such as a roof mirror or optical fibers may be employed for redirecting a beam, but prisms are preferred because an incident beam incurs less loss upon penetrating the base surface and being internally reflected in a prism than upon being reflected by two mirror surfaces.

First beam director 210 is disposed with base surface 520 adjacent pump chamber housing 205 and substantially perpendicular to axes 507(1–4). Second beam director 215 is disposed with base surface 535 substantially perpendicular to axes 507(1–4) and adjacent pump chamber housing 205 opposite first beam director 210. First beam director 210 and second beam director 215 are positioned relative to each other such that laser medium element axes 507(1&2) are spaced symetrically about a bisector 545 of the right angle 532 apex of the second beam director, and such that pairs of laser medium element axes 507(1&4) and axes 507(2&3) are spaced symetrically about a bisector 540 of the right angle 517 apex of the first beam director.

For simplicity optical path 255 is discussed as having a beginning and an end, but in fact optical path 255 is a bi-directional path, along which light emitted from elements 505(1–4) travels in both directions as it resonates between reflector 220 and output coupler 225. A light beam reflected by reflector 220 passes along axis 507(3) through element 505(3) and enters by base surface 520 into first beam director 210. The beam is next reflected by internal reflecting surface 515 and then by internal reflecting surface 510 such that optical path 255 is redirected 180 degrees as the beam exits base surface 520 of first beam director 210 and, because elements 505(2&3) are disposed symetrically about bisector 540, the beam is aligned with axis 507(2) of element 505(2).

The beam then passes along axis 507(2) through element 505(2) and enters by base surface 535 into second beam director 215. The optical path 255 is redirected 180 degrees by internal reflecting surface 525 and then by internal reflecting surface 530 such that as the beam exits base surface 535 of second beam director 215, and because elements 505(1&2) are disposed symetrically about bisector 545, the beam is aligned with axis 507(1) of element 505(1).

Next, after passing along axis 507(1) of element 505(1) the beam enters again through base surface 520 into first beam director 210. The beam is redirected by internal reflecting surface 510 and then by internal reflecting surface 515 along optical path 255 to exit first beam director base surface 520, and because elements 505(1&4) are disposed symetrically about bisector 540, the beam is aligned with axis 507(4) of element 505(4).

Finally, the beam travels along axis 507(4) through element 505(4) and follows optical path 255 to output coupler 225, which passes a first portion of the beam as laser output beam 260 and reflects a second portion of the beam back along optical path 255.

While the above description discloses the invention in an embodiment as a four-element, folded beam laser, those skilled in the art should understand that the principle of the invention may be extended to a laser system having a larger, even number of elements.

Figure 6:
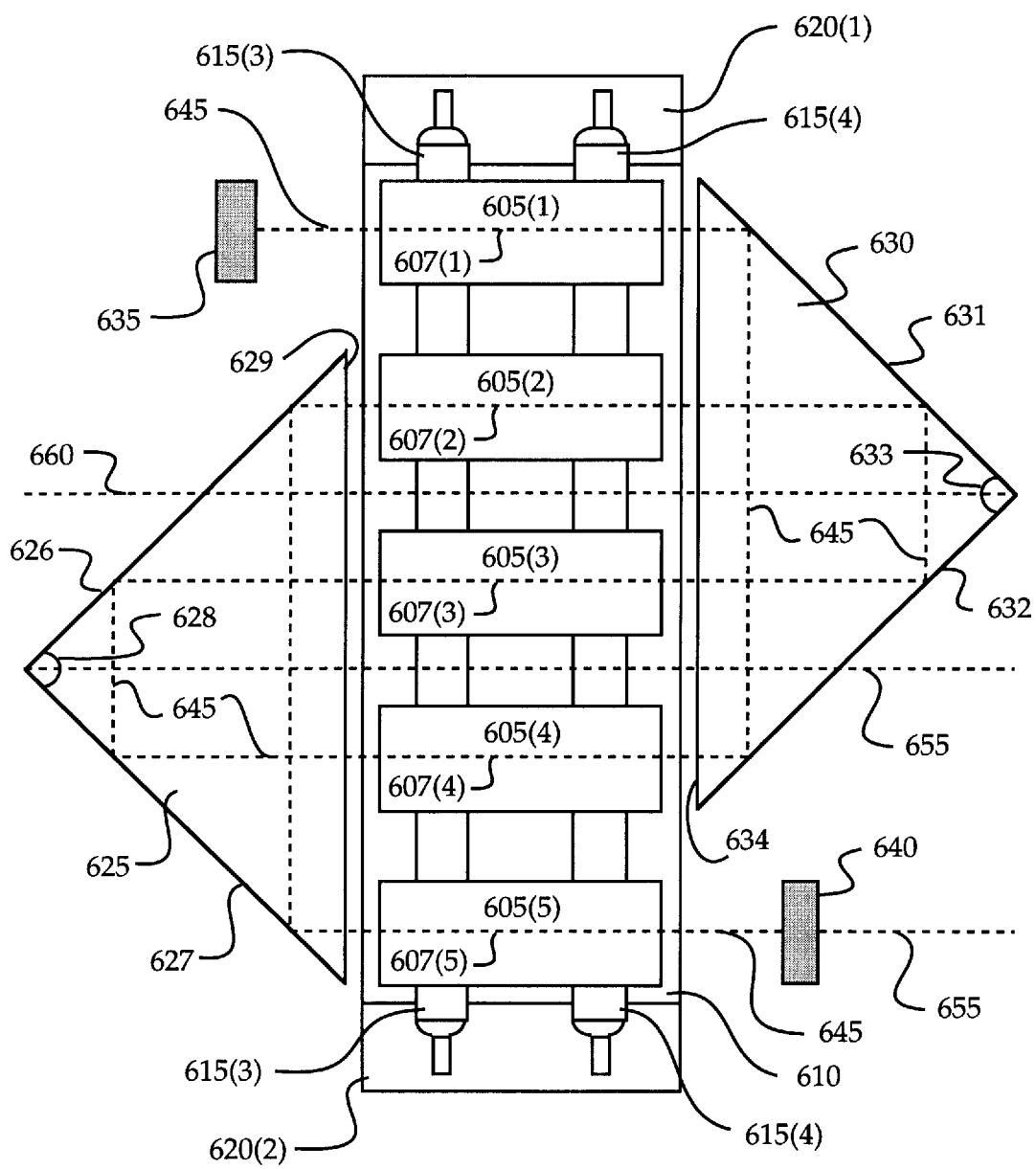
FIG. 6 is a cross-sectional view of an alternate embodiment of a laser having an odd number of laser elements constructed in accordance with the present invention.

FIG. 6 shows a cross-section of an alternate embodiment, laser 600, of the present invention oriented like FIG. 5 but having an odd number, specifically five, of laser medium elements 605(1–5). Laser 600 further includes a pump chamber housing 610, arc lamps 615(3, 4) and (1, 2, not visible in FIG. 6), insulator blocks 620(1, 2), a first beam director 625, a second beam director 630, a highly reflecting reflector 635, and an output coupler 640. Laser medium elements 605(1–5) are right circular cylindrical rods, each having a respective central axis 607(1–5), and are disposed with their respective central axes 607(1–5) parallel, coplanar and equally spaced.

Pumping light incident from arc lamps 615(1–4) stimulates the five laser medium elements 605(1–5) to emit a laser beam which is directed by beam directors 625 and 630 along optical path 645. Reflector 635 reflects nearly 100% of incident laser light back along optical path 645. Output coupler 640 passes a portion of the incident laser light as laser output beam 650 and reflects the remainder of the incident laser light back along optical path 645, thus establishing an optical resonator in the cavity defined between reflector 635 and output coupler 640.

First beam director 625 is preferably a right isosceles prism, having two orthogonal internally reflecting surfaces 626 and 627, the vertex of which forms a right angle 628, and a base surface 629. Second beam director 630 is preferably also a right isosceles prism, having two orthogonal internally reflecting surfaces 631 and 632, the vertex of which forms a right angle 633, and a base surface 634. The pair of reflecting surfaces 626 and 627 in beam director 625 and the pair of reflecting surfaces 631 and 632 in beam director 630, having orthogonal dispositions, each redirects incident light beams 180 degrees.

First beam director 625 is disposed with base surface 629 adjacent pump chamber housing 610 and substantially perpendicular to axes 607(1–5). Second beam director 630 is disposed with base surface 634 substantially perpendicular to axes 607(1–5) and adjacent pump chamber housing 610 opposite first beam director 625. First beam director 625 and second beam director 630 are positioned relative to each other such that pairs of laser medium element axes 605(3&4) and 605(2&5) are spaced symetrically about a bisector 655 of the right angle 628 apex of first beam director 625, and such that pairs of laser medium element axes 607(2&3) and axes 607(1&4) are spaced symetrically about a bisector 660 of the right angle 633 apex of second beam director 630.

A light beam reflected by reflector 635 passes along axis 607(1) through element 605(1) and enters by base surface 634 into second beam director 630. The beam is next reflected by internal reflecting surface 631 and then by internal reflecting surface 632 such that optical path 645 is redirected 180 degrees as the beam exits base surface 634 of second beam director 630 aligned with axis 607(4) of element 605(4).

The beam passes along axis 607(4) through element 605(4) and enters by base surface 629 into first beam director 625. The optical path 645 is redirected 180 degrees by internal reflecting surface 627 and then by internal reflecting surface 626 such that the beam exits base surface 629 of first beam director 625, aligned with axis 607(3) of element 605(3).

Next, after passing along axis 607(3) of element 605(3) the beam enters again through base surface 634 into second beam director 630. The beam is redirected by internal reflecting surface 632 and then by internal reflecting surface 631 along optical path 645 to exit second beam director base surface 634 aligned with axis 607(2) of element 605(2).

Next, after passing along axis 607(2) of element 605(2) the beam enters again through base surface 629 into first beam director 625. The beam is redirected by internal reflecting surface 626 and then by internal reflecting surface 627 along optical path 645 to exit second beam director base surface 629, and because elements 605(2&5) are disposed symetrically about bisector 655, the beam is aligned with axis 607(5) of element 605(5).

Finally, the beam travels along axis 607(5) through element 605(5) and follows optical path 645 to output coupler 640, which passes a first portion of the beam as laser output beam 650 and reflects a second portion of the beam back along optical path 645.

While the above description discloses the invention in an embodiment as a five-element, folded beam laser, those skilled in the art should understand that the principle of the invention may be extended to a laser system having a larger, odd number of elements.

Figure 7A:
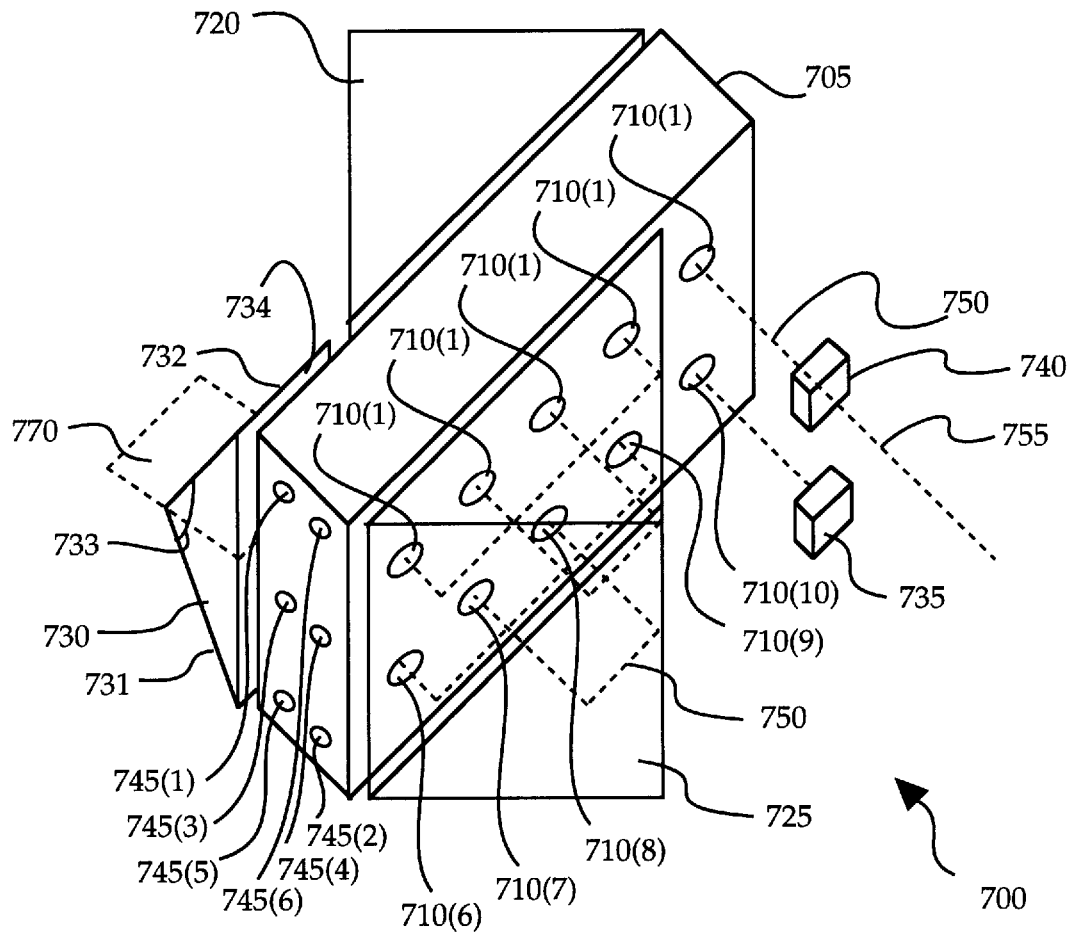
FIG. 7A is a perspective view of an alternate embodiment of a laser having two rows of elements and three beam directors.

FIG. 7A shows an alternate embodiment, laser 700, of the present invention including a pump chamber housing 705, an upper row of laser medium elements 710(1–5), a lower row of laser medium elements 710(6–10), a first intraplanar beam director 720, a second intraplanar beam director 725, an interplanar beam director 730, a highly reflective reflector 735, an output coupler 740, and a plurality of arc lamps 745(1–6). An optical path 750 passes from reflector 735 to output coupler 740, between which the path 750 is folded by beam directors 720, 725 and 730. Pump chamber housing 705 supports laser medium elements 710(1–10), of which only one end of each is visible in FIG. 7A. Each element 710(1–10) has a respective central axis 715(1–10) (FIGS. 7A & 7B) coincident with optical path 750. Housing 705 also supports arc lamps 745(1–5) which are supplied with electrical power via electrical leads (not shown) passing through insulator blocks (not shown).

Pumping light incident from arc lamps 240(1–6) stimulates laser media elements 710(1–10) to emit a laser beam which is directed by beam directors 720, 725 and 730 along optical path 750. Reflector 735 reflects nearly 100% of incident laser light back along optical path 750. Output coupler 740 passes a portion of the incident laser light as laser output beam 755 and reflects the remainder of the incident laser light back along optical path 750, thus establishing an optical resonator in the cavity defined between reflector 735 and output coupler 740.

FIG. 7B shows a cross-section of laser 700 (housing 705 and lamps 745(5, 6) omitted) along a horizontal plane passing through the lower row of laser medium elements 710(6–10). FIG. 7C shows a cross-section of laser 700 (housing 705 and lamps 745(3–6) omitted) along a horizontal plane passing through the upper row of laser medium elements 710(1–5). Laser medium elements 710(1–5) are right circular cylindrical rods disposed with their respective central axes 715(1–5) parallel, coplanar and equally spaced. Laser medium elements 710(6–10) are also right circular cylindrical rods disposed with their respective central axes 715(6–10) parallel, coplanar and spaced equally. Additionally, axes 715(1–5) of elements 710(1–5) are parallel to axes 715(6–10) of elements 710(6–10). Laser medium elements 710(1–10) are preferably solid state crystals such as ruby rods.

First intraplanar beam director 720 is preferably a right isosceles prism, having two orthogonal internally reflecting surfaces 721 and 722, the vertex of which forms a right angle 723, and a base surface 724. Second intraplanar beam director 725 is preferably also a right isosceles prism, having two orthogonal internally reflecting surfaces 726 and 727, the vertex of which forms a right angle 728, and a base surface 729. Interplanar beam director 730 is preferably also a right isosceles prism, having two orthogonal internally reflecting surfaces 731 and 732, the vertex of which forms a right angle 733, and a base surface 734. The pair of reflecting surfaces 721 and 722 in beam director 720, the pair of reflecting surfaces 726 and 727 in beam director 725, and the pair of reflecting surfaces 731 and 732 in beam director 730, having orthogonal dispositions, each redirects incident light beams 180 degrees.

First intraplanar beam director 720 is disposed with base surface 724 a spaced distance from one end of elements 710(2–5, 7–10) and substantially perpendicular to axes 715(2–5, 7–10). Second intraplanar beam director 725 is disposed with base surface 729 substantially perpendicular to axes 715(1–4, 6–9) and a spaced distance from ends of elements 710(1–4, 6–9) opposite first intraplanar beam director 720. Further, first intraplanar beam director 720 and second intraplanar beam director 725 are positioned relative to each other such that pairs of laser medium element axes 715(2&5, 3&4, 7&10, 8&9) are spaced symetrically about a plane bisector 760 of the right angle 723 apex of first intraplanar beam director 720, and such that pairs of laser medium element axes 715(1&4, 2&3, 6&9, 7&8) are spaced symetrically about a plane bisector 765 of the right angle 728 apex of second intraplanar beam director 725.

Interplanar beam director 730 is disposed with base surface 734 substantially perpendicular to axes 715(1&6) and a spaced distance from ends of elements 710(1&6) opposite second intraplanar beam director 725. Further, interplanar beam director 730 is disposed such that laser medium element axes 715(1&6) are spaced symetrically about a plane bisector 770 of the right angle 733 vertex of interplanar beam director 730.

For simplicity optical path 750 is discussed, with reference to FIGS. 7 B&C, as having a beginning and an end, but in fact optical path 750 is a bi-directional path, along which light emitted from elements 710(1–10) travels in both directions as it resonates between reflector 735 and output coupler 740. A light beam reflected by reflector 735 passes along axis 715(10) through element 710(10) and enters by base surface 724 into first intraplanar beam director 720. The beam is reflected by internal reflecting surface 721 and then by internal reflecting surface 722 such that optical path 750 is redirected 180 degrees as the beam exits base surface 724 of first intraplanar beam director 720 aligned with axis 715(7) of element 710(7).

The beam then passes along axis 715(7) through element 710(7) and enters by base surface 729 into second intraplanar beam director 725. Optical path 750 is redirected 180 degrees by internal reflecting surface 726 and then by internal reflecting surface 727 such that as the beam exits base surface 729 of second intraplanar beam director 725 aligned with axis 715(8) of element 710(8).

Next, after passing along axis 715(8) of element 710(8) the beam enters again through base surface 724 into first intraplanar beam director 720. The beam is redirected by internal reflecting surface 722 and then by internal reflecting surface 721 along optical path 750 to exit first intraplanar beam director base surface 724 aligned with axis 715(9) of element 710(9).

Next, after passing along axis 715(9) of element 710(9) the beam enters again through base surface 729 into second intraplanar beam director 725. The beam is redirected by internal reflecting surface 727 and then by internal reflecting surface 726 along optical path 750 to exit second intraplanar beam director base surface 729 aligned with axis 715(6) of element 710(6).

Next, the beam enters through base surface 734 into interplanar beam director 730. The beam is redirected by internal reflecting surface 731 and (now in FIG. 7C) by internal reflecting surface 732 along optical path 750 to exit interplanar beam director base surface 734 aligned with axis 715(1) of element 710(1).

Next, after passing along axis 715(1) of element 710(1) the beam enters again through base surface 729 into second intraplanar beam director 725. The beam is redirected by internal reflecting surface 726 and then by internal reflecting surface 727 along optical path 750 to exit second intraplanar beam director base surface 729 aligned with axis 715(4) of element 710(4).

Next, after passing along axis 715(4) of element 710(4) the beam enters again through base surface 724 into first intraplanar beam director 720. The beam is redirected by internal reflecting surface 721 and then by internal reflecting surface 722 along optical path 750 to exit first intraplanar beam director base surface 724 aligned with axis 715(3) of element 710(3).

Next, after passing along axis 715(3) of element 710(3) the beam enters again through base surface 729 into second intraplanar beam director 725. The beam is redirected by internal reflecting surface 727 and then by internal reflecting surface 726 to exit second intraplanar beam director base surface 729 aligned with axis 715(2) of element 710(2).

Next, after passing along axis 715(2) of element 710(2) the beam enters again through base surface 724 into first intraplanar beam director 720. The beam is redirected by internal reflecting surface 722 and then by internal reflecting surface 721 to exit first intraplanar beam director base surface 724 aligned with axis 715(5) of element 710(5).

Finally, the beam travels along axis 715(5) through element 710(5) and follows optical path 750 to output coupler 740, which passes a first portion of the beam as laser output beam 755 and reflects a second portion of the beam back along optical path 750.

While the above description discloses the invention in an embodiment as a folded beam laser having ten laser medium elements, arranged in two rows of five elements, and including exactly three beam directors, those skilled in the art should understand that the inventive principle of the disclosed embodiment may be extended to a laser system having two rows of a greater or lesser number of elements.

Figure 8A:
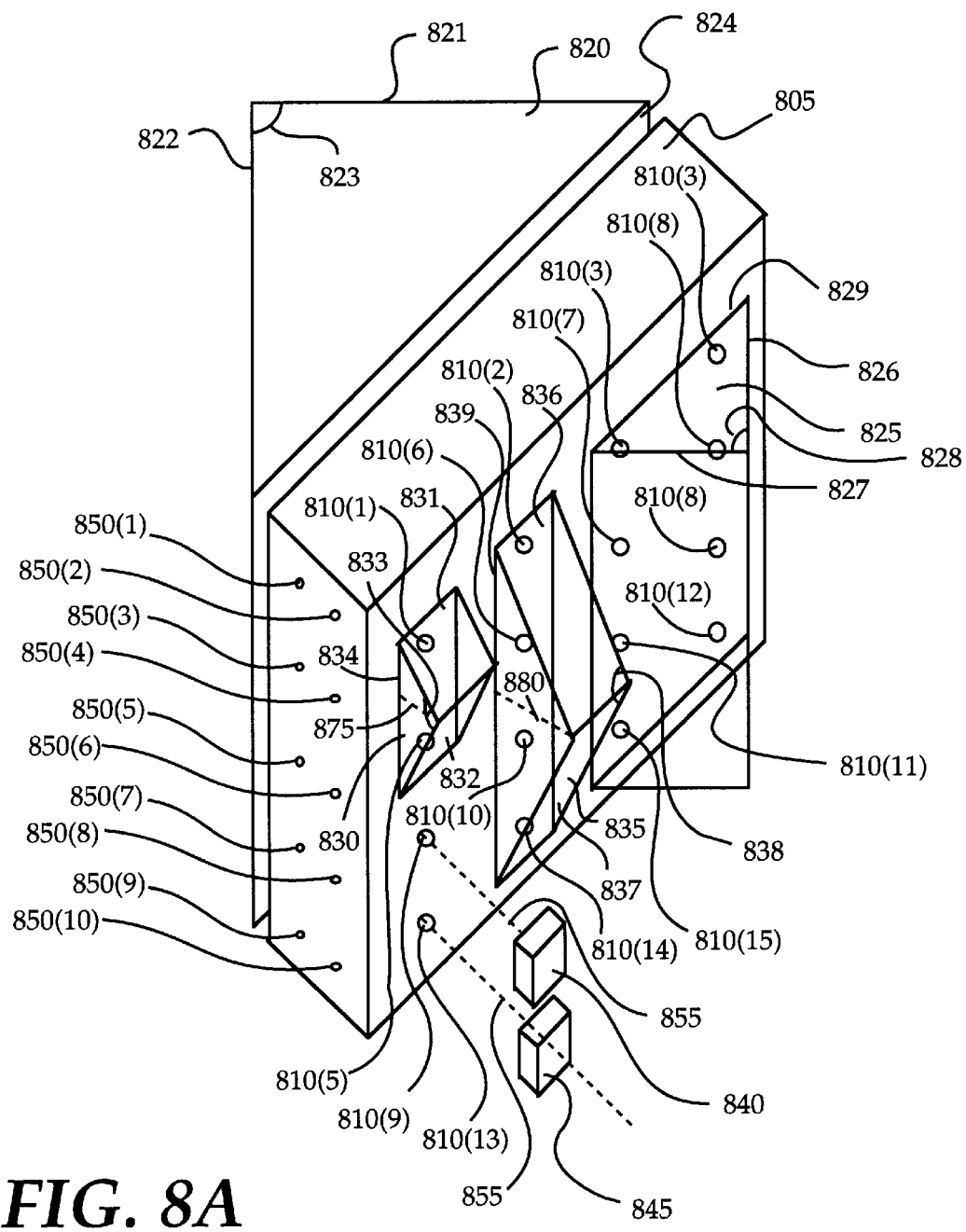

As shown in FIG. 8A, the present invention may also be embodied as a laser having more than two rows of laser medium elements. Particularly, FIG. 8A shows a laser 800 including sixteen laser medium elements 810(1–16) arranged in four rows of four elements, with the first row containing elements 810(1–4), the second row containing elements 810(5–8), the third row containing elements 810(9–12), and the fourth row containing elements 810(13–16).

Laser 800 further includes a pump chamber housing 805, a first intraplanar beam director 820, a second intraplanar beam director 825, a first interplanar beam director 830, a second interplanar beam director 835 a highly reflective reflector 840, an output coupler 845, and a plurality of arc lamps 850(1–10). An optical path 855 passes from reflector 840 to output coupler 845, between which the path 855 is folded by beam directors 820, 825, 830 and 835. Pump chamber housing 805 supports laser medium elements 810 (1–16), of which only one end of each is visible in FIG. 8A. Each element 810(1–16) has a central axis 815(1–16) (FIGS. 8B–E) coincident with optical path 855. Housing 805 also supports arc lamps 850(1–10) which are supplied with electrical power via electrical leads (not shown) passing through insulator blocks (not shown).

Pumping light incident from arc lamps 850(1–10) stimulates laser media elements 810(1–16) to emit a laser beam which is directed by beam directors 820, 825, 830 and 835 along optical path 855. Reflector 840 reflects nearly 100% of incident laser light back along optical path 855. Output coupler 845 passes a portion of the incident laser light as laser output beam 860 and reflects the remainder of the incident laser light back along optical path 855, thus establishing an optical resonator in the cavity defined between reflector 840 and output coupler 845.

FIGS. 8B–E show cross-sections of laser 800 (housing 805 and lamps 850(1–10) omitted) along horizontal planes passing through laser medium elements 810(9–12), laser medium elements 810(5–8), laser medium elements 810 (1–4), and laser medium elements 810(13–16), respectively. Laser medium elements 810(1–16) are right circular cylindrical rods. Elements within each row, 810(1–4), 810(5–8), 810(9–12), and 810(13–16), are disposed with their respective central axes 815(1–4), 815(5–8), 815(9–12) and 815 (13–16) parallel, coplanar and equally spaced. Additionally, axes 815(1–16) of elements 810(1–16) are all co-parallel. Laser medium elements 810(1–16) are preferably solid state crystals such as ruby rods.

First intraplanar beam director 820 is preferably a right isosceles prism, having two orthogonal internally reflecting surfaces 821 and 822, the vertex of which forms a right angle 823, and a base surface 824. Second intraplanar beam director 825 is preferably also a right isosceles prism, having two orthogonal internally reflecting surfaces 826 and 827, the vertex of which forms a right angle 828, and a base surface 829. First interplanar beam director 830 is preferably also a right isosceles prism, having two orthogonal internally reflecting surfaces 831 and 832, the vertex of which forms a right angle 833, and a base surface 834. Second interplanar beam director 835 is preferably also a right isosceles prism, having two orthogonal internally reflecting surfaces 836 and 837, the vertex of which forms a right angle 838, and a base surface 839. The pair of reflecting surfaces 821 and 822 in beam director 820, the pair of reflecting surfaces 826 and 827 in beam director 825, the pair of reflecting surfaces 831 and 832 in beam director 830 and the pair of reflecting surfaces 836 and 837 in beam director 835, having orthogonal dispositions, each redirects incident light beams 180 degrees.

First intraplanar beam director 820 is disposed with base surface 824 a spaced distance from one end of elements 810(1–16) and substantially perpendicular to axes 815 (1–16). Second intraplanar beam director 825 is disposed with base surface 829 substantially perpendicular to axes 815(1–16) and a spaced distance from ends of elements 810(3–4, 7–8, 11–12, 15–16) opposite first intraplanar beam director 820. Further, first intraplanar beam director 820 and second intraplanar beam director 825 are positioned relative to each other such that pairs of laser medium element axes 815(1&4, 2&3, 5&8, 6&7, 9&12, 10&11, 13&16, 14&15) are spaced symetrically about a plane bisector 865 of the right angle 823 apex of first intraplanar beam director 820, and such that pairs of laser medium element axes 815(3&4, 7&8, 11&12, 15&16) are spaced symetrically about a plane bisector 870 of the right angle 828 apex of second intraplanar beam director 825.

First interplanar beam director 830 is disposed with base surface 834 substantially perpendicular to axes 815(1–16) and a spaced distance from ends of elements 810(1&5) opposite first intraplanar beam director 820. Further, first interplanar beam director 830 is disposed such that laser medium element axes 815(1&5) are spaced symetrically about a plane bisector 875 of right angle 833 vertex of interplanar beam director 830. Second interplanar beam director 835 is disposed with base surface 839 substantially perpendicular to axes 815(1–16) and a spaced distance from ends of elements 810(2, 6, 10, 14) opposite first intraplanar beam director 820. Further, second interplanar beam director 835 is disposed such that pairs of laser medium element axes 815(2&14, 6&10) are spaced symetrically about a plane bisector 880 of right angle 838 vertex of interplanar beam director 835.

For simplicity optical path 855 is discussed, with reference to FIGS. 8 B–E, as having a beginning and an end, but in fact optical path 855 is a bi-directional path, along which light emitted from elements 810(1–16) travels in both directions as it resonates between reflector 840 and output coupler 845. Starting in FIG. 8B, a light beam reflected by reflector 840 passes along axis 815(9) through element 810(9) and enters by base surface 824 into first intraplanar beam director 820. The beam is next reflected by internal reflecting surface 822 and then by internal reflecting surface 821 such that optical path 855 is redirected 180 degrees as the beam exits base surface 824 of first intraplanar beam director 820 aligned with axis 815(12) of element 810(12).

The beam then passes along axis 815(12) through element 810(12) and enters by base surface 829 into second intraplanar beam director 825. Optical path 855 is redirected 180 degrees by internal reflecting surface 826 and then by internal reflecting surface 827 such that the beam exits base surface 829 of second intraplanar beam director 825 aligned with axis 815(11) of element 810(11).

Next, after passing along axis 815(11) of element 810(11) the beam enters again through base surface 824 into first intraplanar beam director 820. The beam is redirected by internal reflecting surface 821 and then by internal reflecting surface 822 along optical path 855 to exit first intraplanar beam director base surface 824 aligned with axis 815(10) of element 810(10).

Next, after passing along axis 815(10) of element 810(10) the beam enters through base surface 839 into second interplanar beam director 835. The beam is redirected by internal reflecting surface 837 and (now in FIG. 8C) by internal reflecting surface 836 along optical path 855 to exit second interplanar beam director base surface 839 aligned with axis 815(6) of element 810(6).

Next, after passing along axis 815(6) of element 810(6) the beam enters again through base surface 824 into first intraplanar beam director 820. The beam is redirected by internal reflecting surface 822 and then by internal reflecting surface 821 along optical path 855 to exit first intraplanar beam director base surface 824 aligned with axis 815(7) of element 810(7).

Next, after passing along axis 815(7) of element 810(7) the beam enters again through base surface 829 into second intraplanar beam director 825. The beam is redirected by internal reflecting surface 827 and then by internal reflecting surface 826 along optical path 855 to exit second intraplanar beam director base surface 829 aligned with axis 815(8) of element 810(8).

Next, after passing along axis 815(8) of element 810(8) the beam enters again through base surface 824 into first intraplanar beam director 820. The beam is redirected by internal reflecting surface 821 and then by internal reflecting surface 822 along optical path 855 to exit first intraplanar beam director base surface 824 aligned with axis 815(5) of element 810(5).

Next, after passing along axis 815(5) of element 810(5) the beam enters through base surface 834 into first interplanar beam director 830. The beam is redirected by internal reflecting surface 832 and then by internal reflecting surface 831 (now in FIG. 8D) along optical path 855 to exit first interplanar beam director base surface 834 aligned with axis 815(1) of element 810(1).

Next, after passing along axis 815(1) of element 810(1) the beam enters again through base surface 824 into first intraplanar beam director 820. The beam is redirected by internal reflecting surface 822 and then by internal reflecting surface 821 along optical path 855 to exit first intraplanar beam director base surface 824 aligned with axis 815(4) of element 810(4).

Next, after passing along axis 815(4) of element 810(4) the beam enters again through base surface 829 into second intraplanar beam director 825. The beam is redirected by internal reflecting surface 826 and then by internal reflecting surface 827 along optical path 855 to exit second intraplanar beam director base surface 829 aligned with axis 815(3) of element 810(3).

Next, after passing along axis 815(3) of element 810(3) the beam enters again through base surface 824 into first intraplanar beam director 820. The beam is redirected by internal reflecting surface 821 and then by internal reflecting surface 822 along optical path 855 to exit first intraplanar beam director base surface 824 aligned with axis 815(2) of element 810(2).

Next, after passing along axis 815(2) of element 810(2) the beam enters through base surface 839 into second interplanar beam director 835. The beam is redirected by internal reflecting surface 836 and then by internal reflecting surface 837 (now in FIG. 8D) along optical path 855 to exit second interplanar beam director base surface 839 aligned with axis 815(14) of element 810(14).

Next, after passing along axis 815(14) of element 810(14) the beam enters again through base surface 824 into first intraplanar beam director 820. The beam is redirected by internal reflecting surface 822 and then by internal reflecting surface 821 along optical path 855 to exit first intraplanar beam director base surface 824 aligned with axis 815(15) of element 810(15).

Next, after passing along axis 815(15) of element 810(15) the beam enters again through base surface 829 into second intraplanar beam director 825. The beam is redirected by internal reflecting surface 827 and then by internal reflecting surface 826 along optical path 855 to exit second intraplanar beam director base surface 829 aligned with axis 815(16) of element 810(16).

Next, after passing along axis 815(16) of element 810(16) the beam enters again through base surface 824 into first intraplanar beam director 820. The beam is redirected by internal reflecting surface 821 and then by internal reflecting surface 822 along optical path 855 to exit first intraplanar beam director base surface 824 aligned with axis 815(13) of element 810(13).

Finally, the beam travels along axis 815(13) through element 810(13) and follows optical path 855 to output coupler 845, which passes a first portion of the beam as laser output beam 860 and reflects a second portion of the beam back along optical path 855.

While the above description discloses the invention in an embodiment as a folded beam laser having sixteen laser medium elements, arranged in four rows of four elements, and including exactly four beam directors, those skilled in the art should understand that the inventive principle of the disclosed embodiment may be extended to a laser system having a greater or lesser number of rows of a greater or lesser number of elements.

Figure 9:
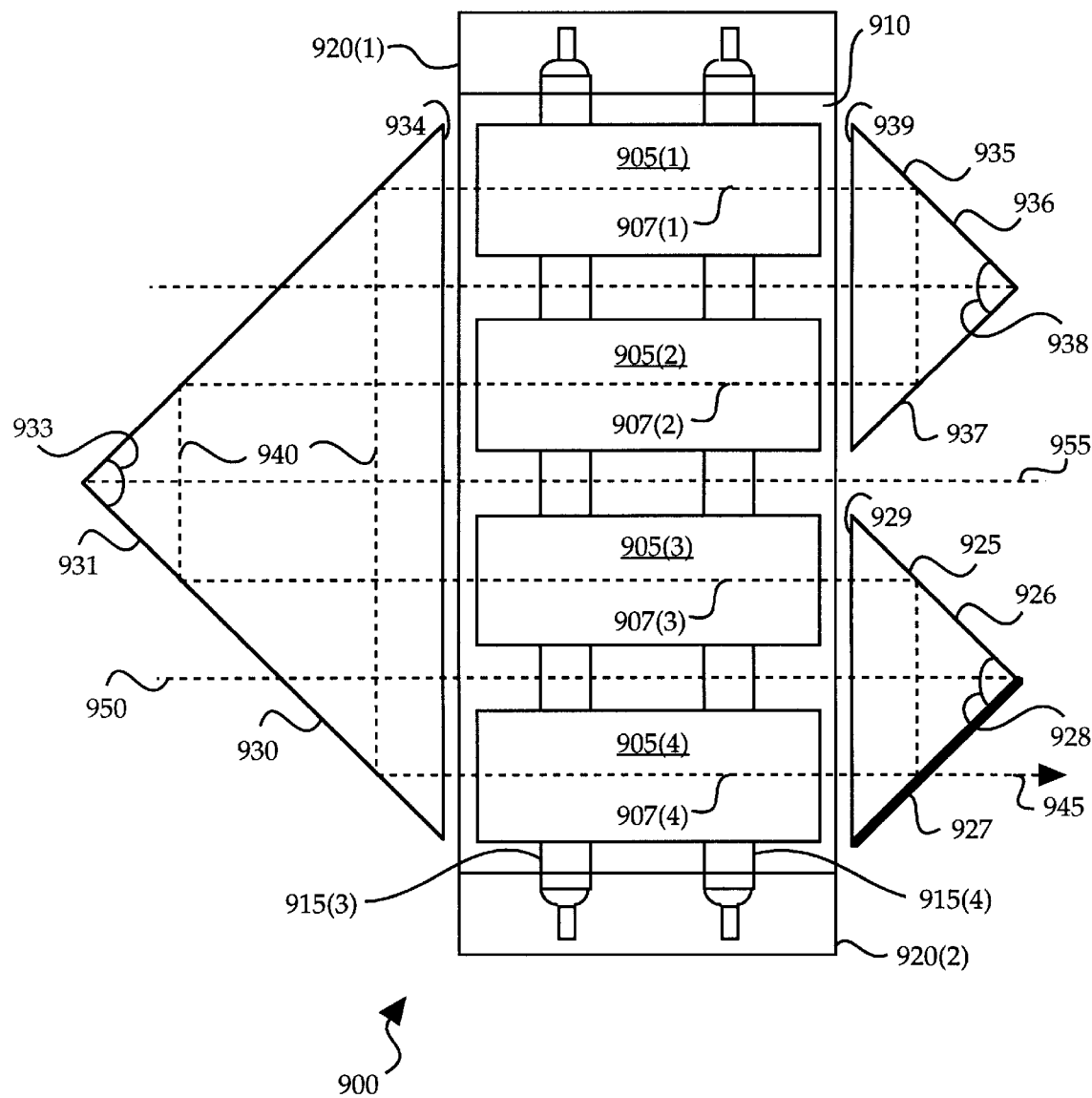
FIG. 9 shows a horizontal cross-section of a ring laser constructed in accordance with the present invention.

FIG. 9 shows a horizontal cross-section of an alternate embodiment, ring laser 900, of the present invention including laser medium elements 905(1–4), a pump chamber housing 910, arc lamps 915(1–4, of which 1 and 2 are not shown), insulator blocks 920(1–2), an output beam director 925, a first beam director 930, and a second beam director 935. Laser medium elements 905(1–4) are preferably right circular cylindrical rods, each having a respective central axis 907(1–4), and are disposed with their respective central axes 907(1–4) parallel, coplanar and equally spaced. Laser medium elements 905(1–5) are preferably solid state crystals such as ruby rods.

Pumping light incident from arc lamps 915(1–4) stimulates the four laser media elements 905(1–4) to emit a laser beam which is directed by beam directors 925, 930 and 935 along optical path 940. Output beam director 925 is preferably a right isosceles prism, having two orthogonal internally reflecting surfaces 926 and 927, the vertex of which forms a right angle 928, and a base surface 929. Internally reflecting surface 927 is coated with a material of suitable refractive index to partially frustrate internal reflection of incident laser light, such that surface 927 passes a portion of the incident laser light as laser output beam 945 and reflects the remainder of the incident laser light 90 degrees along optical path 940, thus establishing a ring optical resonator in the cavity defined along optical path 940. Further, while it is possible for the ring laser to lase in either direction along optical path 940, known methods, which are beyond the scope of this invention, may be employed to cause ring laser 900 to lase in only one direction.

First beam director 930 is also preferably a right isosceles prism, having two orthogonal internally reflecting surfaces 931 and 932, the vertex of which forms a right angle 933, and a base surface 934. Second beam director 935 is preferably also a right isosceles prism, having two orthogonal internally reflecting surfaces 936 and 937, the vertex of which forms a right angle 938, and a base surface 939. The pair of reflecting surfaces 926 and 927 in beam director 925, the pair of reflecting surfaces 931 and 932 in beam director 930, and the pair of reflecting surfaces 936 and 937 in beam director 935, having orthogonal dispositions, each redirects incident light beams 180 degrees.

Output beam director 925 is disposed with base surface 929 a spaced distance from one end of laser medium elements 905(3–4) and substantially perpendicular to axes 907(1–4). First beam director 930 is disposed with base surface 934 substantially perpendicular to axes 907(1–4) and a spaced distance from ends of laser medium elements 905(1–4) opposite output beam director 925. Second beam director 935 is disposed with base surface 939 substantially perpendicular to axes 907(1–4) and a spaced distance from ends of laser medium elements 905(1–2) opposite first beam director 930. Further, output beam director 925, first beam director 930, and second beam director 935 are positioned relative to each other such that laser medium element axes 907(3&4) are spaced symetrically about a bisector 950 of the right angle 933 apex of output beam director 925, such that pairs of laser medium element axes 907(1&4) and axes 907(2&3) are spaced symetrically about a bisector 955 of the right angle 933 apex of first beam director 930, and such that pairs of laser medium element axis 907(1&2) are spaced symetrically about a bisector 960 of the right angle 938 apex of second beam director 935.

For simplicity optical path 940 is discussed as having a beginning and an end, but in fact optical path 940 is a looped, bi-directional path, along which light emitted from elements 905(1–4) can travel in both directions. Known ring laser methods are employed, however, to cause ring laser 900 to lase in only one direction. Partially internal reflecting surface passes a first portion of an incident beam traveling along axis 907(4) through element 905(4) as laser output beam 945 and reflects a second portion of the beam along optical path 940, in the direction of internal reflecting surface 926. Next, the beam is reflected by internal reflecting surface 926 out through base surface 929 of output beam director 925, and because elements 905(3&4) are disposed symetrically about bisector 950, the beam is aligned with axis 907(3) of element 905(3).

The beam then passes along axis 907(3) through element 905(3) and enters by base surface 934 into first beam director 930. The optical path 940 is redirected 180 degrees by internal reflecting surface 931 and then by internal reflecting surface 932 such that the beam exits base surface 934 of first beam director 930 aligned with axis 907(2) of element 905(2).

Next, after passing along axis 907(2) of element 905(2) the beam enters through base surface 939 into second beam director 935. The beam is redirected by internal reflecting surface 937 and then by internal reflecting surface 936 along optical path 940 to exit second beam director base surface 939 aligned with axis 907(1) of element 905(1).

Next, after passing along axis 907(1) of element 905(1) the beam enters again through base surface 934 into first beam director 930. The beam is redirected by internal reflecting surface 932 and then by internal reflecting surface 931 along optical path 940 to exit first beam director base surface 934 aligned with axis 907(4) of element 905(4).

Finally, the beam travels along axis 907(4) through element 905(4) and follows optical path 940 to internal reflecting surface 927 of output beam director 925, thus completing the loop of optical path 940.

While the above description discloses the invention in an embodiment as a four-element, folded beam ring laser, those skilled in the art should understand that the inventive principle of the disclosed embodiment may be extended to a laser system having a larger number of elements.

Figure 10:
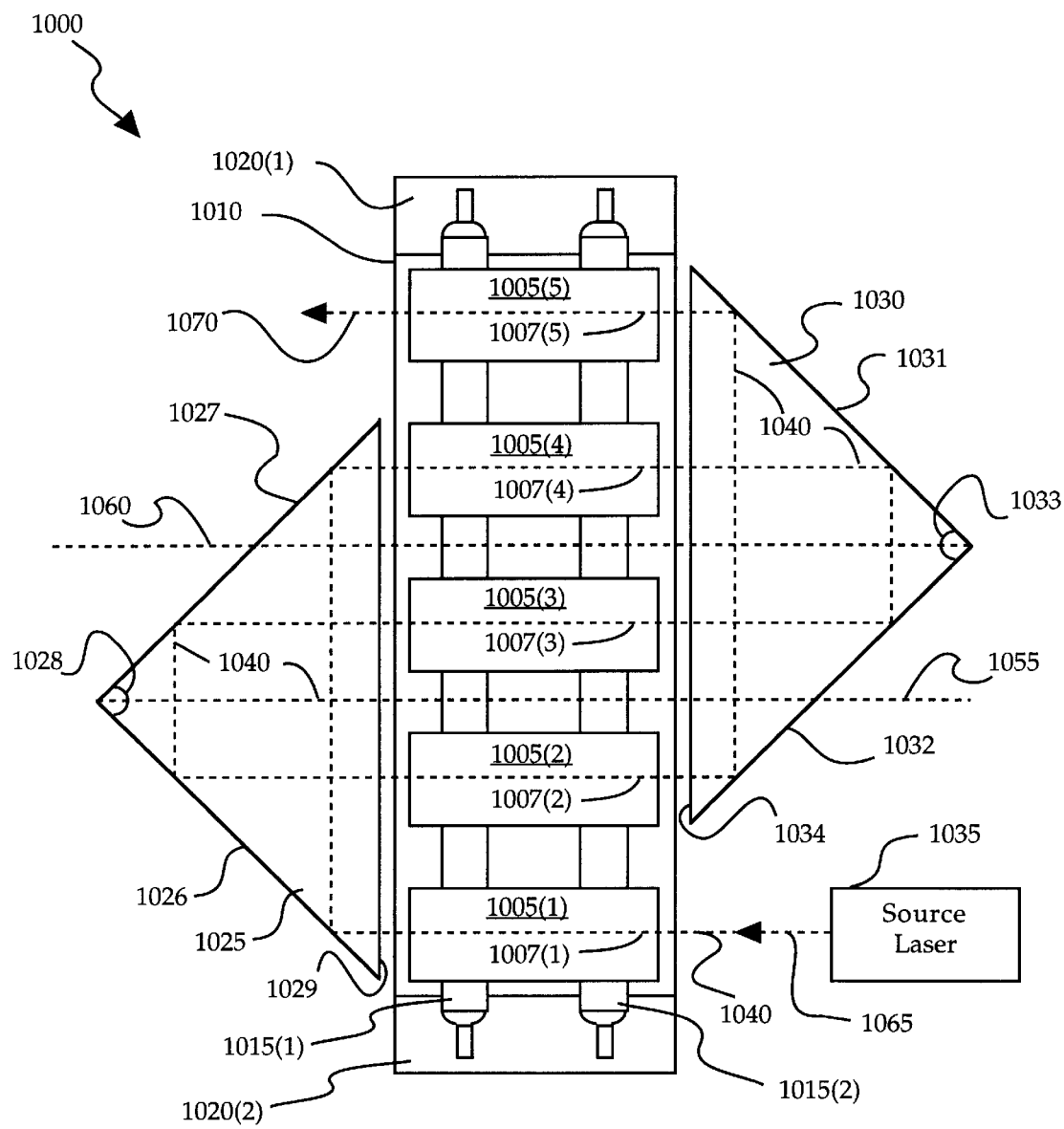
FIG. 10 shows a horizontal cross-section of a laser amplifier constructed in accordance with the present invention.

FIG. 10 shows a cross-section of an alternate embodiment, laser amplifier 1000, of the present invention including five laser medium elements 1005(1–5), pump chamber housing 1010, arc lamps 1015(1, 2), insulator blocks 1020(1, 2), a first beam director 1025, and a second beam director 1030. Pumping light incident from arc lamps 1015(1, 2) stimulates the five laser medium elements 1005 (1–5) to emit light which amplifies a laser beam produced by a source laser 1035 and directed by beam directors 1025 and 1030 along an optical path 1040. Laser medium elements 1005(1–5) are right circular cylindrical rods, each having a respective central axis 1007(1–5), and are disposed with their respective central axes 1007(1–5) parallel, coplanar and equally spaced. Laser medium elements 1005(1–5) are preferably solid state crystals such as ruby rods, but non-solid state laser media elements such as a liquid or gas medium in glass containers are within the scope of the invention.

First beam director 1025 is preferably a right isosceles prism, having two orthogonal internally reflecting surfaces 1026 and 1027, the vertex of which forms a right angle 1028, and a base surface 1029. Second beam director 1030 is preferably also a right isosceles prism, having two orthogonal internally reflecting surfaces 1031 and 1032, the vertex of which forms a right angle 1033, and a base surface 1034. The pair of reflecting surfaces 1026 and 1027 in beam director 1025 and the pair of reflecting surfaces 1031 and 1032 in beam director 1030, having orthogonal dispositions, each redirects incident light beams 180 degrees. Alternative means such as a roof mirror or optical fibers may be employed for redirecting a beam, but prisms are preferred because an incident beam incurs less loss upon penetrating the base surface and being internally reflected in a prism than upon being reflected by two mirror surfaces.

First beam director 1025 is disposed with base surface 1029 adjacent to pump chamber housing 1010 and substantially perpendicular to axes 1007(1–5). Second beam director 1030 is disposed with base surface 1034 substantially perpendicular to axes 1007(1–5) and adjacent to pump chamber housing 1010 opposite first beam director 1025. Further, first beam director 1025 and second beam director 1030 are positioned relative to each other such that pairs of laser medium element axes 1005(1&4) and 1005(2&3) are spaced symetrically about a bisector 1055 of the right angle 1028 apex of first beam director 1025, and such that pairs of laser medium element axes 1007(2&5) and 1007(3&4) are spaced symetrically about a bisector 1060 of the right angle 1033 apex of second beam director 1030.

A laser beam 1065 emitted by source laser 1035 enters amplifier 1000, passes along axis 1007(1) through element 1005(1) and enters by base surface 1034 into first beam director 1025. The beam is next reflected by internal reflecting surface 1026 and then by internal reflecting surface 1027 such that optical path 1040 is redirected 180 degrees as the beam exits base surface 1029 of first beam director 1025 aligned with axis 1007(4) of element 1005(4).

The beam then passes along axis 1007(4) through element 1005(4) and enters by base surface 1034 into second beam director 1030. The optical path 1040 is redirected 180 degrees by internal reflecting surface 1031 and then by internal reflecting surface 1032 such that the beam exits base surface 1034 of second beam director 1030 aligned with axis 1007(3) of element 1005(3).

Next, after passing along axis 1007(3) of element 1005(3) the beam enters again through base surface 1029 into first beam director 1025. The beam is redirected by internal reflecting surface 1027 and then by internal reflecting surface 1026 along optical path 1040 to exit first beam director base surface 1029 aligned with axis 1007(2) of element 1005(2).

Next, after passing along axis 1007(2) of element 1005(2) the beam enters again through base surface 1034 into second beam director 1030. The beam is redirected by internal reflecting surface 1032 and then by internal reflecting surface 1031 along optical path 1040 to exit second beam director base surface 1034 aligned with axis 1007(5) of element 1005(5).

Finally, the beam travels along axis 1007(5) through element 1005(5) and exits amplifier 1000 as amplified laser beam 1070.

While the above description discloses the invention in an embodiment as a five-element, folded beam laser amplifier, those skilled in the art should understand that the inventive principle of the disclosed embodiment may be extended to a laser system having a greater or lesser number of elements. For example, the lasers 200, 600, 700, and 800, of FIGS. 2, 4, 7, and 8 respectively, could be used as amplifiers by omitting the high reflectors and the output couplers (i.e. 735 and 740 of FIG. 7) and directing the beam of a source laser along the axis of the element (i.e. 710(10) of FIG. 7) that was disposed adjacent to the removed high reflector 735.

Thus, several embodiments of the present invention have been disclosed. Other embodiments will be obvious to those skilled in the art, because the invention may be practiced apart from the specific details set forth herein.

I claim:

1. A laser comprising:
    at least four laser medium elements each having a first end and a second end and a longitudinal axis extending between the first and second ends;
    pumping means for exciting the plurality of laser medium elements to emit a beam;
    a high reflector configured to reflect the beam such that a segment of the beam reflected from the high reflector is substantially coincident with a segment of the beam incident on the high reflector;
    a partially reflective output coupler positioned in the beam; and
    a set of beam directors having pairs of reflective surfaces, positioned adjacent at least a portion of the ends of the laser medium elements, for directing the beam along an optical path extending along the longitudinal axes of the plurality of laser medium elements and between the high reflector and the output coupler, at least one of the set of beam directors being configured to produce a plurality of beam folds between at least two distinct pairs of said laser medium elements from one of said pairs of reflective surfaces of said beam directors, each of the plurality of beam folds comprising a 180 degree beam fold wherein a folded segment of the beam is parallel to and spaced from an incident segment of the beam.

2. The laser of claim 1 wherein the at least one of the set of beam directors comprises a prism.

3. The laser of claim 2 wherein the prism is a right isosceles prism.

4. The laser of claim 1, wherein the plurality of laser medium elements have their longitudinal axes positioned in substantially mutually parallel relationship.

5. The laser of claim 4, wherein the plurality of laser medium elements are coplanar.

6. The laser of claim 5, wherein the laser medium elements are equally spaced.

7. The laser of claim 1, wherein the plurality of laser medium elements comprise solid state laser medium elements.

8. The laser of claim 7 wherein the solid state laser medium elements comprise rods.

9. The laser of claim 1 wherein the pumping means comprise at least one lamp.

10. The laser of claim 9 wherein the at least one lamp comprises an arc lamp.

11. The laser of claim 1 wherein the set of beam directors comprises a first and a second beam director, the first beam director being positioned adjacent at least a portion of the first ends of the laser medium elements, the second beam director being positioned adjacent at least a portion of the second ends of the laser medium elements.

12. The laser of claim 1, wherein:
the plurality of laser medium elements comprises a first group of laser medium elements having their longitudinal axes lying in a first plane, and a second group of laser medium elements having their longitudinal axes lying in a second plane; and
the set of beam directors comprises two intraplanar beam directors for redirecting the beam within the first and second planes, and one interplanar beam director for redirecting the beam between the first and second planes.

13. The laser of claim 12 wherein the first and second planes are substantially parallel.

14. A laser comprising:
at least four laser medium elements each including two opposing ends and a central axis extending between the opposing ends;
pumping means for exciting the plurality of laser medium elements to emit a beam;
a high reflector configured to reflect the beam such that a segment of the beam reflected from the high reflector is substantially coincident with a segment of the beam incident on the high reflector;
a partially reflective output coupler positioned in the beam;
the plurality of laser medium elements comprising a plurality of laser medium element groups, the laser medium elements within each of the groups having their central axes in mutually parallel relation, wherein the plurality of laser medium element groups define a corresponding plurality of planes; and
a set of beam directors having pairs of reflective surfaces, positioned adjacent at least a portion of the ends of the laser medium elements, for directing the beam along an optical path extending along the central axes of the plurality of laser medium elements and between the high reflector and the output coupler, at least one of the set of beam directors being configured to produce a plurality of beam folds between at least two distinct pairs of said laser medium elements from one of said pairs of reflective surfaces of said beam directors, each of the plurality of beam folds comprising a 180 degree beam fold wherein a folded segment of the beam is oriented substantially parallel to and spaced from an incident segment of the beam.

15. The laser of claim 14, wherein the set of beam directors comprises a set of intraplanar beam directors for directing the beam within at least one plane, and a set of interplanar beam directors for directing the beam between or among a plurality of planes.

16. The laser of claim 14, wherein the plurality of planes are substantially mutually parallel.

17. The laser of claim 14, wherein the laser medium elements within each of the plurality of groups are equally spaced.

18. The laser of claim 14, wherein the laser medium elements are arranged in a regularly-spaced rectilinear array of intraplanar rows and interplanar columns.

19. The laser of claim 18, wherein the central axes of the plurality of laser medium elements are substantially mutually parallel.

20. The laser of claim 14, wherein the at least one of the set of beam directors comprises a prism.

21. The laser of claim 20, wherein the prism comprises a right isosceles prism.

22. A laser beam amplifier comprising:
at least four laser medium elements, each having a first and a second end and a longitudinal axis extending between the first and second ends, for emitting light to amplify a laser beam traveling along the longitudinal axes of the plurality of laser medium elements;
pumping means for exciting the plurality of laser medium elements to emit the light; and
a set of beam directors having pairs of reflective surfaces, positioned adjacent at least a portion of the ends of the laser medium elements, for directing the beam on a path extending along the longitudinal axes of the plurality of laser medium elements, at least one of the set of beam directors being configured to produce a plurality of beam folds between at least two distinct pairs of said laser medium elements from one of said pairs of reflective surfaces of said beam directors, each of the beam folds comprising a 180 degree beam fold wherein a folded segment of the beam is oriented parallel to and spaced from an incident segment of the beam.

23. The laser beam amplifier of claim 22, wherein the at least one of the set of beam directors comprises a prism.

24. The laser beam amplifier of claim 22, wherein the longitudinal axes of the plurality of laser medium elements are mutually parallel.

25. A ring laser comprising:
at least four laser medium elements, each having a first and a second end and a longitudinal axis extending between the first and second ends, for emitting a laser beam;
pumping means for exciting the plurality of laser medium elements to emit the beam;
a set of beam directors having pairs of reflective surfaces, positioned adjacent at least a portion of the ends of the laser medium elements, for directing the beam on a path extending along the longitudinal axes of the plurality of laser medium elements, at least one of the set of beam directors being configured to produce a plurality of beam folds between at least two distinct pairs of said laser medium elements from one of said pairs of reflective surfaces of said beam directors, each of the beam folds comprising a 180 degree beam fold wherein a folded segment of the beam is oriented parallel to and spaced from an incident segment of the beam; and
an output coupler positioned in the beam for reflecting a first portion of the beam along the optical path and passing a second portion of the beam.

26. The ring laser of claim 25, wherein the longitudinal axes of the plurality of laser medium elements are substantially parallel.

27. The ring laser of claim 25, wherein the at least one of the set of beam directors comprises a prism.

* * * * *